United States Patent
Morrison et al.

(10) Patent No.: US 6,617,013 B2
(45) Date of Patent: Sep. 9, 2003

(54) CERAMIC MATRIX COMPOSITE HAVING IMPROVED INTERLAMINAR STRENGTH

(75) Inventors: Jay A. Morrison, Oviedo, FL (US); Gary Brian Merrill, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/852,595

(22) Filed: May 10, 2001

(65) Prior Publication Data

US 2002/0168505 A1 Nov. 14, 2002

(51) Int. Cl.⁷ .............................................. B32B 18/00
(52) U.S. Cl. .............................. 428/293.4; 428/293.7; 428/364; 428/372; 428/378; 428/398; 428/401; 428/903; 428/384
(58) Field of Search ............................... 428/384, 698, 428/699, 364, 372, 378, 401, 293.4, 293.7, 903

(56) References Cited

U.S. PATENT DOCUMENTS

| | | | |
|---|---|---|---|
| 3,458,387 A | * | 7/1969 | Suskind et al. |
| 4,146,663 A | * | 3/1979 | Ikeda et al. |
| 4,490,203 A | | 12/1984 | Bose |
| 4,908,494 A | | 3/1990 | Faiz et al. |
| 5,132,178 A | * | 7/1992 | Chyung et al. ............. 428/372 |
| 5,160,822 A | | 11/1992 | Aleshin |
| 5,223,064 A | * | 6/1993 | Gadkaree |
| 5,225,015 A | | 7/1993 | Allaire et al. |
| 5,503,703 A | | 4/1996 | Dahotre et al. |
| 5,576,069 A | | 11/1996 | Chen et al. |
| 5,928,448 A | * | 7/1999 | Daws |
| 5,947,094 A | * | 9/1999 | Atmur et al. |
| 5,990,025 A | | 11/1999 | Suyama et al. |
| 6,013,592 A | | 1/2000 | Merrill et al. |
| 6,030,563 A | | 2/2000 | Strasser et al. |
| 6,132,542 A | * | 10/2000 | Cutler et al. |
| 6,135,006 A | | 10/2000 | Strasser et al. |
| 6,144,008 A | | 11/2000 | Rabinovich |
| 6,167,859 B1 | | 1/2001 | Strasser et al. |

FOREIGN PATENT DOCUMENTS

| | | | |
|---|---|---|---|
| EP | 0424988 | | 1/1987 |
| EP | 0424988 | * | 5/1991 |

OTHER PUBLICATIONS

COI Ceramics at http://www.coiceramics.com/cmcdevelopment.htm.

* cited by examiner

Primary Examiner—Merrick Dixon

(57) ABSTRACT

A ceramic matrix composite material (10) having a plurality of interlaminar stitches (16) as shown in FIG. 1. The stitches are formed by directing laser energy into the material to melt and recast zones of the material in a direction transverse to the layers of reinforcing fibers(12). The stitches not only improve the interlaminar strength of the material, but they also increase the through-thickness thermal conductivity of the material, thereby reducing thermal-induced stresses. The zones of recast material (18) may define holes (20) extending at least partially through the thickness of the material. The holes may be filled with a filler material (24), thereby mitigating any adverse loss-of-area effect created by the holes.

19 Claims, 1 Drawing Sheet

CERAMIC MATRIX COMPOSITE HAVING IMPROVED INTERLAMINAR STRENGTH

FIELD OF THE INVENTION

The present invention related generally to the field of materials technology, and more specifically to ceramic matrix composite materials, and in particular to a ceramic matrix composite material having improved interlaminar strength and a method of manufacturing such material.

BACKGROUND

Ceramic materials generally have excellent hardness, heat resistance, abrasion resistance, and corrosion resistance, and are therefore desirable for high temperature machine applications such as gas turbines and the like. However, ceramic materials are easily fractured by tensile stresses and exhibit a high degree of brittleness. To improve upon the fracture toughness of a ceramic material, it is known to provide a ceramic matrix composite (CMC) material wherein a plurality of inorganic or metal fibers are disposed in a matrix of ceramic material. The fibers provide tensile strength and toughness to augment the other desirable properties of the ceramic material. A CMC material may be formed by impregnating a preform of fiber-containing fabric material with ceramic material powder using a known wet method such as slip casting or slurry infiltration. The cast or laid-up part is then dried using low pressures and temperatures to form a green body. The green body is then sintered by known techniques such as atmospheric-pressure sintering or reaction sintering to sinter the matrix to its final density to form the ceramic matrix composite material. One example of a commercially available oxide fiber/oxide matrix CMC material is a Nextel 720 fiber/alumina matrix composite available from COI Ceramics, Inc. of San Diego, Calif.

One of the limitations in the application of ceramic matrix composite materials to combustion turbine applications is the available interlaminar shear and tensile strength of the composite. For many such applications, the predicted interlaminar stresses exceed the design allowable limits for commercially available materials. Methods for improving these properties are therefore needed.

One possibility for improving the interlaminar tensile strength of a CMC material is matrix densification. Current oxide CMC's are made using a one-step matrix processing which yields a high level of porosity. This porosity gives the composite maximum in-plane strength, strain tolerance and notch insensitivity. Increasing matrix density by additional infiltration steps would improve the matrix-dominated properties (interlaminar shear and tension) of the composite. However, increased matrix density has been shown to dramatically decrease the desirable in-plane properties and would result in a more brittle failure mode for the material.

Another way to improve the interlaminar tensile strength of a CMC material is to incorporate a fiber coating. For non-oxide CMC's, a weak interface coating on the fiber has been shown to improve load distribution from the matrix to the fibers and to yield a tough, high strength composite. Work is in progress to develop weak fiber/matrix interface coatings for oxide-based CMC's. These coatings are still under development and their benefits have yet to be demonstrated for this class of material.

A third approach to improved interlaminar strength is 3D fiber reinforcement. Three dimensional woven and braided fiber preforms are commercially available and would serve to improve the interlaminar properties of the composite. In order to achieve this benefit, some compromise of in-plane fiber orientation and volume fraction is necessary, resulting in degraded in-plane properties. In spite of many years of research and demonstration, the manufacture of 3D woven preforms has yet to be automated. High preform cost due to a labor intensive process, operator-dependent quality issues, and high capital outlay required for dedicated machinery are all barriers to the commercialization of woven 3D preforms. Three dimensional braided preforms, while more automated, are size and complexity limited by the equipment that is available today. In addition, all 3D reinforcement options require the development of new matrix infiltration methods and compositions, thereby moving away from the commercial lamination method of wet prepreg lay-up.

Rather than full 3D preforming, it is known to stitch 2D laminates with ceramic fibers to obtain a 3D fiber. This method has been performed commercially, but only on dry preforms and on fairly simple geometries. The action of stitching damages both in-plane fibers and through-thickness fibers so that the advantage gained is less than predicted based on fiber volume fraction estimates. The limitation of the method to dry preforms means that new matrix infiltration processes would need to be developed to accommodate such stitching. Importantly, complex shapes needed for many applications, such as turbine vane leading edges, are beyond the capability of existing methods.

Accordingly, there is a need for improving the interlaminar shear and tensile strength of a ceramic matrix composite material without degrading the in-plane properties of the material. There is a further need for a method of improving the interlaminar shear and tensile strength of a ceramic matrix composite material that is commercially practical and that can be implemented with existing infiltration processes.

BRIEF SUMMARY OF THE INVENTION

An improved material is described herein as including a composite material having a plurality of layers of fibers disposed within a matrix material, and a plurality of stitches of recast composite material disposed through a thickness of the composite material transverse to the layers of fibers. Each stitch in the improved material may be a generally tubular shaped zone of recast composite material defining a hole formed in the composite material. A filler material may be disposed within the hole, and such filler material may be an adhesive material or may be one of the group of a phosphate-based composition having oxide ceramic filler particles and a silica-based composition having oxide ceramic filler particles. If the nominal cross-sectional diameter of the stitches is defined to be d, and the nominal distance between stitch centerlines is defined to be D, then D divided by d may be in the range of 4 to 7. For high temperature applications, the material may have a layer of thermally insulating material disposed on the composite material. For such an embodiment, each stitch may be a zone of recast composite material defining a hole extending through the composite material, with the hole extending into the layer of thermally insulating material; or each stitch may be a zone of recast composite material defining a hole extending through less than the full thickness of the composite material, with the hole extending through the layer of thermally insulating material.

A method of producing a material is described herein as including: providing a ceramic composite material having a plurality of layers of ceramic fibers disposed within a ceramic matrix material; forming a plurality of stitches through a thickness of the composite material in a direction transverse to the layers, each stitch comprising a zone of recast composite material. The method may further include forming the stitches in a pattern selected to achieve a predetermined level of interlaminar strength in the material or in a pattern selected to achieve a predetermined level of thermal conductivity through the material in a direction transverse to the layers. Advantageously, the method may include: forming each of the stitches by directing laser energy into the composite material to form a volume of melted composite material; and allowing the melted composite material to cool to form the zone of recast composite material. In one embodiment, the method includes: forming each of the stitches by directing laser energy into the composite material to form a hole surrounded by the zone of recast composite material; and filling the hole with a filler material, such as a ceramic adhesive material or a unidirectional fiber reinforced prepreg material that is cured in situ within the hole. The holes may be filled with one of a phosphate-based composition having oxide ceramic filler particles and a silica-based composition having oxide ceramic filler particles. Such holes may be formed prior to or after a step of densification of the matrix material. In one embodiment, the method may include the further step of disposing a layer of thermally insulating material on the composite material, and directing laser energy into the composite material and layer of thermally insulating material to form a plurality of holes each surrounded in the composite material by a zone of recast composite material. The holes may be formed in this embodiment to extend completely through the composite material and only partially through the layer of thermally insulating material, or completely through the thermally insulating material and only partially through the composite material. The stitches may be formed before or after the step of disposing a layer of thermally insulating material on the composite material.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
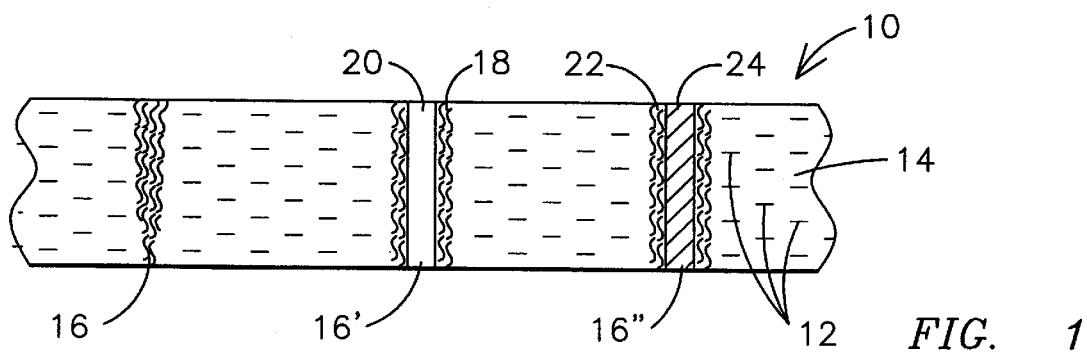
FIG. 1 is a partial cross-sectional view of a composite material having a plurality of interlaminar stitches formed therein.

FIG. 1 illustrates a partial cross-section of a composite material 10 having improved interlaminar strength when compared to prior art materials. Composite material 10 is a ceramic matrix composite material having a plurality of layers of ceramic fibers 12 disposed within a ceramic matrix material 14. The reinforcing fibers 12 may be, for example, oxide based ceramic fibers selected from the group of refractory oxide fibers including $Al_2O_3$, $Al_2O_3$—$SiO_2$, mullite, YAG, and $Al_2O_3$—YAG eutectics. The matrix material 14 may be, for example, an oxide based ceramic material, and may be one of the group of $Al_2O_3$, $Al_2O_3$—$SiO_2$, mullite, YAG, and $LaPO_4$. The present invention may be applied to any reinforced matrix composite material, and may advantageously be applied to CMC materials used in high temperature environments, such as gas turbine engines.

Composite material 10 also includes a plurality of interlaminar stitches 16,16',16" disposed through the thickness of the composite material 10 in a direction transverse to the plane of the layers of fibers 12. In the embodiment illustrated in FIG. 1, the stitches 16 are generally perpendicular to the fibers 12, but in other embodiments they may lie at angles other than ninety degrees. Each stitch 16 is a zone of recast composite material formed by the melting and re-solidification of the fibers 12 and matrix material 14 within the zone. The shape of each stitch 16,16',16" will depend upon the process of heating that is used. Stitch 16 is illustrated as having a generally linear shape, being generally round in cross-section, with a gradually decreasing cross-sectional diameter in a direction from top to bottom through the thickness of the composite material 10. Stitch 16' is illustrated as having a generally tubular shaped zone of recast material 18 defining a hole 20 formed in and through the thickness of the composite material 10. Stitch 16" is illustrated as having a generally tubular shaped zone of recast material 22 defining a hole that is filled with a filler material 24. Filler material 24 may be the composite matrix material, or it may be a unidirectional fiber reinforced prepreg material. In other embodiments the filler material 24 may be an adhesive material, one of the group of a phosphate-based composition having oxide ceramic filler particles and a silica-based composition having oxide ceramic filler particles.

It is known to use lasers to drill small diameter holes in ceramics and ceramic composites. Laser drilling techniques have been developed to remove material by heating with laser light energy for the purpose of leaving a clear hole through a composite. Such holes have been used in ceramic composites for cooling purposes in applications such as combustor liners and vanes in combustion turbines. Stitches 16,16',16" may be formed by directing laser energy into the composite material 10 to form a volume of melted composite material, then allowing the melted composite material to cool to form the zone of recast composite material 16,18,22. The size and shape of the zone of recast material will depend upon the specific material and method of melting that are employed for a particular application.

Parametric studies have indicated that a variety of parameters may be varied to produce stitches having various characteristics. Parameters that may be controlled include power level, pulsed or continuous power, wavelength, spot size, etc. In one example a $CO_2$ laser was used with pulsed power varying from 200–600 watts and with continuous power varying from 200–2200 watts. It was found that lower power rates together with power pulsing are preferred because they produce holes with the maximum amount of melted-recast material, while higher power with continuous power application produced holes with cleaner edges. Particular material conditions and the need to achieve reasonable production rates must be considered to select optimal laser settings for a particular application.

Stitches 16,16',16" are formed in a pattern selected to increase the interlaminar strength of the material when compared to the same fiber/matrix composite without the stitches. Any appropriate pattern may be used, such as a simple square, rectangular or triangular pattern, a spiral pattern, or a pattern where the density of stitches varies at different locations in the material in response to an anticipated stress pattern within the material. Studies conducted on the strength of laser-drilled ceramic composites have shown that in-plane tensile strength is reduced primarily by the Rule-of-Mixtures effects; i.e. there are little or no stress concentration effects, and tensile strength reduction is limited to net section area reduction. In compression, however, very little strength reduction was noted despite the cross-sectional area reduction. The inventors have recognized that this effect is due to the interlaminar stitching effect of the laser drilling process. The laser heating process creates a recast layer in the inside surface of the holes. This recast layer serves as a reinforcement through the thickness of the material, essentially spot-welding the plies together. Since the primary failure mechanism of CMC's in compression is interlaminar tensile failure due to buckling, the effect of this interlaminar stitching is to increase compressive strength. Accordingly, it is possible to form a plurality of interlaminar stitches of recast composite material through the thickness of a composite material in a pattern selected to increase the interlaminar strength of the material when compared to the same material without the stitches.

Figure 2:
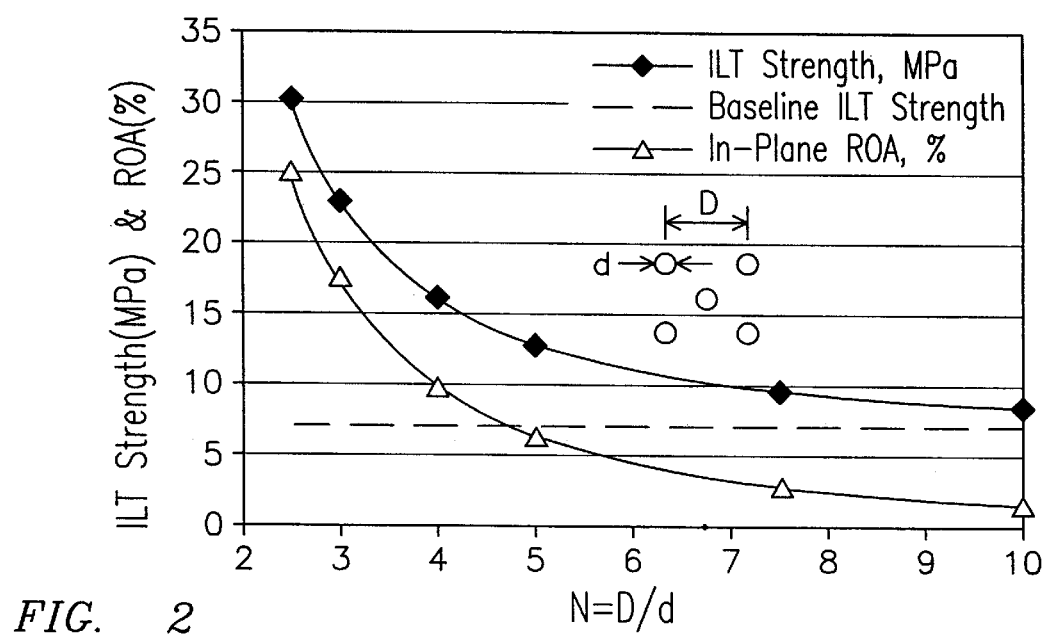
FIG. 2 is a graph illustrating the expected improvement in mechanical properties expected from the addition of a pattern of stitches having a range of spot spacing ratios.

FIG. 2 illustrates the expected benefit in interlaminar strength and reduction of area that would be expected as a result of the formation of a regular pattern of stitches in a composite material. This data is for AS-N720 CMC material available from COI Ceramics, Inc. of San Diego, Calif. This material is an aluminosilicate matrix reinforced with continuous mullite fibers. The mullite fibers are Nextel 720 available from 3M Corporation. Each stitch is a laser formed stitch such as stitch 16 of FIG. 1. As shown in FIG. 2, each stitch has a diameter "d" and adjacent stitches are spaced apart by a distance "D". A spot spacing ratio N is defined as D divided by d. The reduction of in-plane tensile strength is expected to be limited to only the reduction of area (ROA) effects, as illustrated. Accordingly, for a spot spacing ratio N in the range of 4 to 7, the interlaminar strength may be increased by 50–100% when compared to the baseline interlaminar tensile strength of the material without stitches, while the in-plane reduction of area is less than 10%. This tradeoff compares very favorably with other known methods of improving interlaminar strength, and the pattern of stitches may be selected to achieve a predetermined improvement in the material properties. If the holes were filled with a filler material, as in stitch 16" of FIG. 1, the impact on in-plane tensile strength may be mitigated, and the improvement in interlaminar strength may be further improved. This magnitude of improvement will permit CMC's to be used in certain applications where predicted stresses exceed the allowable design strength of commercially available CMC materials, for example in combustion turbine vane applications.

Further benefits may be obtained from such laser stitching as a result of an increase in the through-thickness (translaminar) thermal conductivity of the material when compared to a similar material without stitches. Prior art oxide composite CMC materials generally have low thermal conductivity, for example $K_{th}$ of approximately 2 W/mK. The reason for the low thermal conductivity in these composite laminates is the lack of connectivity of the reinforcement fibers in the thickness direction. Such low thermal conductivity gives rise to high thermal gradients and high thermally-induced stresses in high temperature applications. By providing an interconnecting phase through the thickness of the composite, thermal conductivity may be increased, with a corresponding reduction in thermally-inducted stresses. It is expected that a material having stitches comprising 10% of the volume of the material may have a thermal conductivity increase of between 10–20%, depending upon the particular materials used. Within appropriate physical and material property constraints for any given application, a pattern of stitches may be selected to achieve a predetermined level of thermal conductivity through a composite material in a direction transverse to the layers of reinforcing material.

Figure 3:
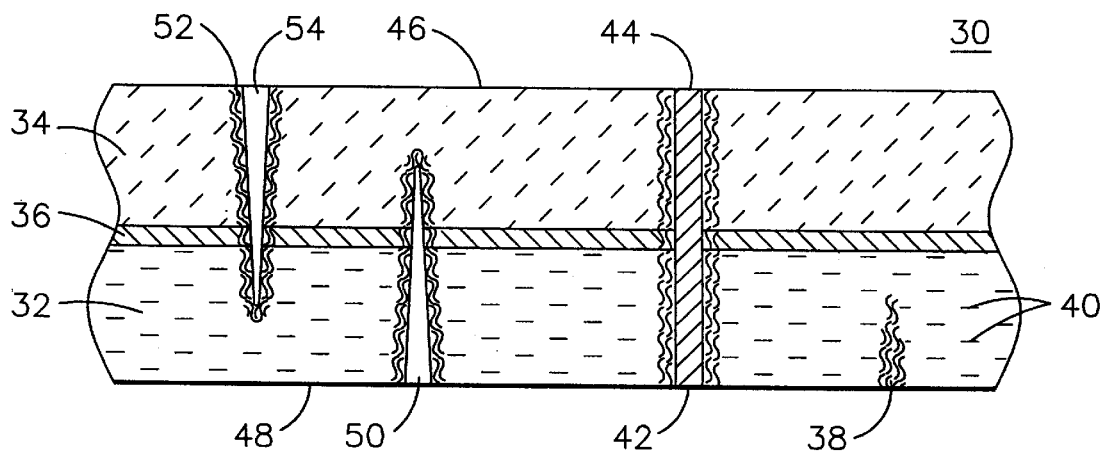
FIG. 3 is a partial cross-sectional view of a composite material having a layer of thermally insulating material disposed thereon, and a plurality of stitches formed therein.

FIG. 3 illustrates another embodiment of a material 30 incorporating a plurality of stitches. Material 30 includes a layer of a ceramic composite material 32 joined to a layer of layer of thermally insulating material 34 by a layer of adhesive material 36. The thermally insulating material 34 may be, for example, hollow ceramic sphere based insulating materials as described in U.S. Pat. No. 6,013,592, or thick thermal barrier coatings, such as mullite or alumina, applied via plasma spray deposition, or any of a variety of high temperature, thermally stable ceramic insulating materials. The adhesive material 36 is selected for its compatibility with the adjoined materials and may be any of a variety of silica or phosphate activated ceramic adhesives with or without ceramic particle fillers; or refractory glasses or glass frit based slurries; or the matrix material of the composite in the case where the insulation and the CMC are co-processed and bonded together via the matrix infiltration and densification. Material 30 includes a pattern of stitches of recast composite material, with several alternative types of stitches being illustrated.

Stitch 38 is a zone of recast composite material extending in a direction transverse to the layers of reinforcing fibers 40, but extending only part way through the thickness of composite material 32. Stitch 38 may be formed by directing laser energy onto composite material 32 prior to or after the application of the thermally insulating material 34. Stitch 38 may be formed before or after the final curing/densification of the low strength green body of composite material 32.

Stitch 42 is a zone of recast material extending the full thickness of material 30 and includes a filler material 44 as described above. Stitch 42 may be formed by directing laser energy onto either the top surface 46 of the thermally insulating material 34 or the bottom surface 48 of the composite material 32.

Stitch 50 is a zone of recast material extending through the full thickness of the composite material 32, through the adhesive layer 36, and through a portion of the thickness of the layer of thermally insulating material 34. Stitch 50 is formed by directing laser energy onto the bottom surface 48 of composite material 32, thereby forming a hole defined by a zone of recast material. Conversely, stitch 52 extends through the full thickness of the layer of thermally insulating material 34 but through only a portion of the thickness of the composite material 32. The recast composite material of stitch 52 defines a hole 54 extending through less than the full thickness of the composite material. Stitch 52 is formed by directing laser energy onto the top surface 46 of the insulating material 34. One may appreciate from the variety of stitches 38,42,50,52 illustrated by FIG. 3 that it is possible to provide stitches to only selected portions of a composite material to achieve a particular predetermined change in the material properties and a predetermined level of interlaminar strength in the material. In particular, it is possible to provide stitches along a top surface and/or a bottom surface of a composite material, as well as in varying patterns across a surface of the material as was described above.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A material comprising:
   a composite material including a plurality of layers of fibers disposed within a matrix material; and
   a plurality of interlaminar stitches of recast composite material disposed through a thickness of the composite material transverse to the layers of fibers, the stitches disposed in a pattern selected to increase the interlaminar strength of the material.

2. The material of claim 1, wherein each stitch comprises a generally tubular shaped zone of recast composite material defining a hole formed in the composite material.

3. The material of claim 2, further comprising a filler material disposed within the hole.

4. The material of claim 2, wherein the filler material comprises one of the group of a phosphate-based composition having oxide ceramic filler particles and a silica-based composition having oxide ceramic filler particles.

5. The material of claim 2, wherein the filler material comprises an adhesive material.

6. The material of claim 2, wherein the filler material comprises a unidirectional fiber reinforced prepreg material.

7. The material of claim 1, wherein the nominal cross-sectional diameter of the stitches is d, and the nominal distance between stitch centerlines is D, and further comprising D divided by d being in the range of 4 to 7.

8. The material of claim 1, wherein each stitch is disposed generally perpendicular to the layers of fibers.

9. The material of claim 1, further comprising a layer of thermally insulating material disposed on the composite material.

10. The material of claim 9, wherein each stitch comprises a zone of recast composite material defining a hole extending through less than the full thickness of the composite material.

11. The material of claim 9, wherein each stitch comprises a zone of recast composite material defining a hole extending through the composite material, with the hole extending into the layer of thermally insulating material.

12. The material of claim 1, wherein each stitch comprises a zone of recast composite material extending through less than the full thickness of the composite material.

13. The material of claim 1, wherein the fibers comprise refractory oxide fibers.

14. The material of claim 14, wherein the fibers comprise one of the group of $Al_2O_3$, $Al_2O_3$—$SiO_2$, mullite, YAG, and $Al_2O_3$—YAG eutectics.

15. The material of claim 1, wherein the matrix material comprises an oxide based ceramic matrix.

16. The material of claim 1, wherein the matrix material comprises one of the group of $Al_2O_3$, $Al_2O_3$—$SiO_2$, mullite, YAG, and $LaPO_4$.

17. The material of claim 9, wherein each stitch comprises a zone of recast composite material defining a hole extending through less than the full thickness of the composite material, with the hole extending through the layer of thermally insulating material.

18. A ceramic matrix composite material comprising:
    a layer of ceramic fibers disposed within a ceramic matrix material forming a composite material cured to at least a green body phase;
    a stitch disposed transverse to the layer of fibers, the stitch comprising a zone of composite material that has been melted and recast.

19. The material of claim 18, wherein the stitch further comprises the zone of recast composite material defining a space and further comprising a filler material filling the space.

* * * * *